Oct. 30, 1934.  F. W. COTTERMAN  1,978,834
AUTOMATIC SPEED CHANGING TRANSMISSION MECHANISM
Filed Jan. 6, 1933  5 Sheets-Sheet 1

Fig. 1

INVENTOR
Frederick W Cotterman

Fig. 2

Oct. 30, 1934.      F. W. COTTERMAN      1,978,834
AUTOMATIC SPEED CHANGING TRANSMISSION MECHANISM
Filed Jan. 6, 1933      5 Sheets-Sheet 4

INVENTOR
Frederick W. Cotterman

Patented Oct. 30, 1934

1,978,834

UNITED STATES PATENT OFFICE

1,978,834

AUTOMATIC SPEED CHANGING TRANSMISSION MECHANISM

Frederick W. Cotterman, Dayton, Ohio, assignor of one-half to Vincent G. Apple, Dayton, Ohio; Herbert F. Apple, Edward M. Apple, and Gourley Darroch, executors of said Vincent G. Apple, deceased Application January 6, 1933, Serial No. 650,523

28 Claims. (Cl. 74—336)

This invention relates to automatic speed changing transmission mechanism, and is particularly suitable for connecting the power of an internal combustion engine to propel an automotive vehicle.

An object of the invention is to eliminate gear shifting by providing mechanism through which an internal combustion engine of greatly variable torque output may be connected to an automotive vehicle in such a manner that the ratio of revolutions between the engine and the vehicle wheels is varied according as the power which the engine is at any time developing is able to drive the vehicle at the ratio then in effect, to the end that, if the fuel which is at any time being fed to the engine will not satisfactorily drive the vehicle with the speed reduction which is then in effect between the engine and the wheels, a greater speed reduction will be automatically provided, and conversely, if the fuel which is at any time being fed to the engine would be able to satisfactorily drive the vehicle with a lesser speed reduction between the engine and wheels than the speed reduction which is then in effect, a lesser speed reduction will be automatically provided.

Another object of the invention is to eliminate declutching by providing, as part of the mechanism, means whereby the engine is entirely disconnected from the wheels whenever the power which it is then developing is too small to propel the vehicle at the lowest ratio of revolutions available between the engine and the wheels, to the end that when sufficient fuel is fed to the engine to drive the vehicle, driving relation between the engine and vehicle is automatically established, and the vehicle is driven, and when insufficient fuel is being fed to the engine to drive the vehicle, driving relation between the engine and the vehicle, is automatically interrupted and the vehicle comes to rest, to the further end that the engine may not be stalled by connection to the load before it is able to carry the load, by braking the vehicle to a stop without declutching, as is the case in common practice.

In automatic automotive transmission mechanisms heretofore proposed where friction clutches responsive to load are employed to effect direct driving relation when the friction clutches are engaged, and gear driving relation when they are disengaged, a fundamental defect has been found to be that when a certain overload disengages a clutch to produce gear driving relation the slightest decrease in that overload again engages the clutch to produce direct driving relation so that if the load being carried varies within narrow limits on each side of the load which will operate the clutch, the clutch will be alternately engaged and disengaged over and over by the slight variation of the load on either side of this line. Again it may so happen in such a mechanism that the load which is operative to disengage a clutch, is such as to only partly disengage it but not enough to entirely disengage it, in which case there is a slippage which rapidly wears away the friction facings.

It is therefore another object of this invention to overcome these objections by providing mechanism wherein clutches, responsive to load conditions, are operative to be engaged for direct drive by a widely different load value than that which disengages them for gear drive, said mechanism being operative also to instantly operate the clutch from full disengagement to full engagement and vice versa, to the end that, when a load value is reached which operates the clutch to produce direct drive, the clutch will instantly be fully engaged and will not again be disengaged until a widely different load condition is reached whereupon it will be instantly and fully disengaged.

That these and numerous lesser objects are attained will be readily apparent, to those skilled in the art, from a consideration of the following description, when taken in conjunction with the drawings, wherein.

The same reference characters will be used to designate the same parts in any and all views in which said parts appear.

The housing 21 together with the cover 22 encloses the transmission mechanism, and is suspended from the engine 23 by the flywheel cover 24. A drive shaft 26 is rotatably supported in a ball bearing 27 within the hub 28 at one end, and in a roller bearing 29 within the hub 31 at the other end. Ball bearing 27 is held in hub 28 by the bearing cap 25 which is in turn held to the housing 21 by the screws 30. The countershaft 32 is parallel to the drive shaft, is supported in hubs 33 and 34, and is held against rotation by the screw 36. An oil supply opening 37 extends longitudinally through the counter-shaft 32 and is kept supplied by the oil feed holes 38 and 39 extending through the hubs 33 and 34. Oil feed holes 41 extend downwardly to convey oil to the interior of the rotative parts. A similar oil supply opening 42 extends longitudinally through the drive shaft 26, but because the drive shaft 26 is rotatable, the special oiling mechanism, broadly designated by the numeral 43, is provided near the end of the shaft to convey oil from the outside of the shaft to the supply opening 42. The manner in which the oiling mechanism 43 functions to accomplish this result will be hereinafter specifically described.

The low speed clutch 44, the intermediate speed clutch 46, and the high speed clutch 47 are spaced apart on the drive shaft 26 within the housing 21. Herringbone gears 48, 49, 51 and 52 surround the drive shaft 26 adjacent the clutches, and may rotate freely about said shaft. Rivets 50 secure the clutch drums 92 and 129 to the gear 48, so that the gear 48 and the drums 92 and 129 must always rotate in unison. Rivets 55 secure the gear 51 to the clutch drum 155. A reversing gear comprising spur gear 53 is permanently connected in driving relation with shaft 26 by multiple splines 54 which are an integral part of the drive shaft 26, the gear being slidable endwise on these splines toward the engine to drive the vehicle forward and oppositely to drive the vehicle backward.

Spaced along the countershaft 32 are the herringbone gears 56, 57, 58 and 59 and the spur gear 61. A spring ratchet 62 makes driving connection between gears 56 and 57 and another spring ratchet 63 makes driving connection between gear 58 and gear 59. Because of the ratchets 62 and 63, the gears 57 and 59 may revolve faster, but not slower, than the gears 56 and 58 respectively. An idler gear 64 (see Fig. 2), revolvable about a stationary stud 66 (see Fig. 18) is permanently in mesh with the spur gear 61.

The gears which necessarily revolve about the countershaft 32 and the stud 66 have press fitted to their interior diameters the bronze bushings 67, 68, 69, 71 and 72, while the parts which sometimes revolve about the drive shaft 26 have press fitted to their interior diameters the bronze bushings 73, 74, 76, 77 and 78. The construction of the low speed clutch 44 will now be described in detail.

*The construction of the low speed clutch*

Figure 1:
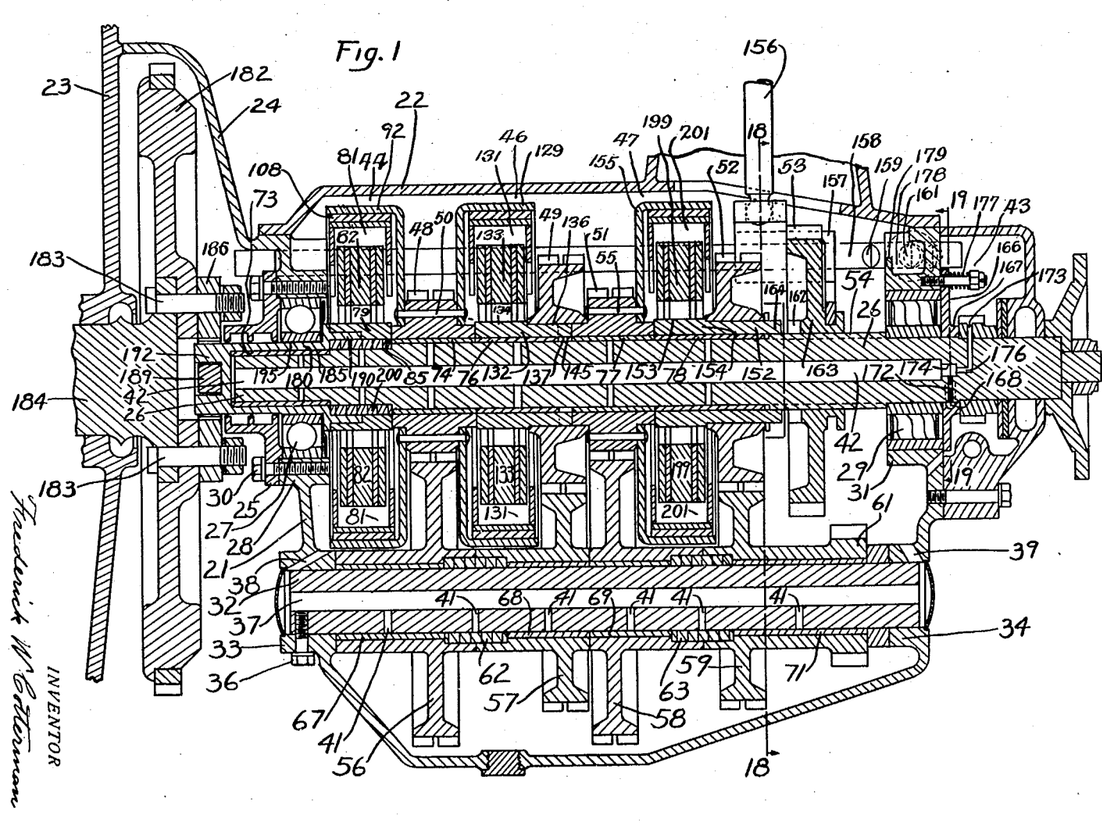
Fig. 1 is a longitudinal vertical section of the transmission mechanism taken through the axes of the drive shaft and counter-shaft.
Figure 2:
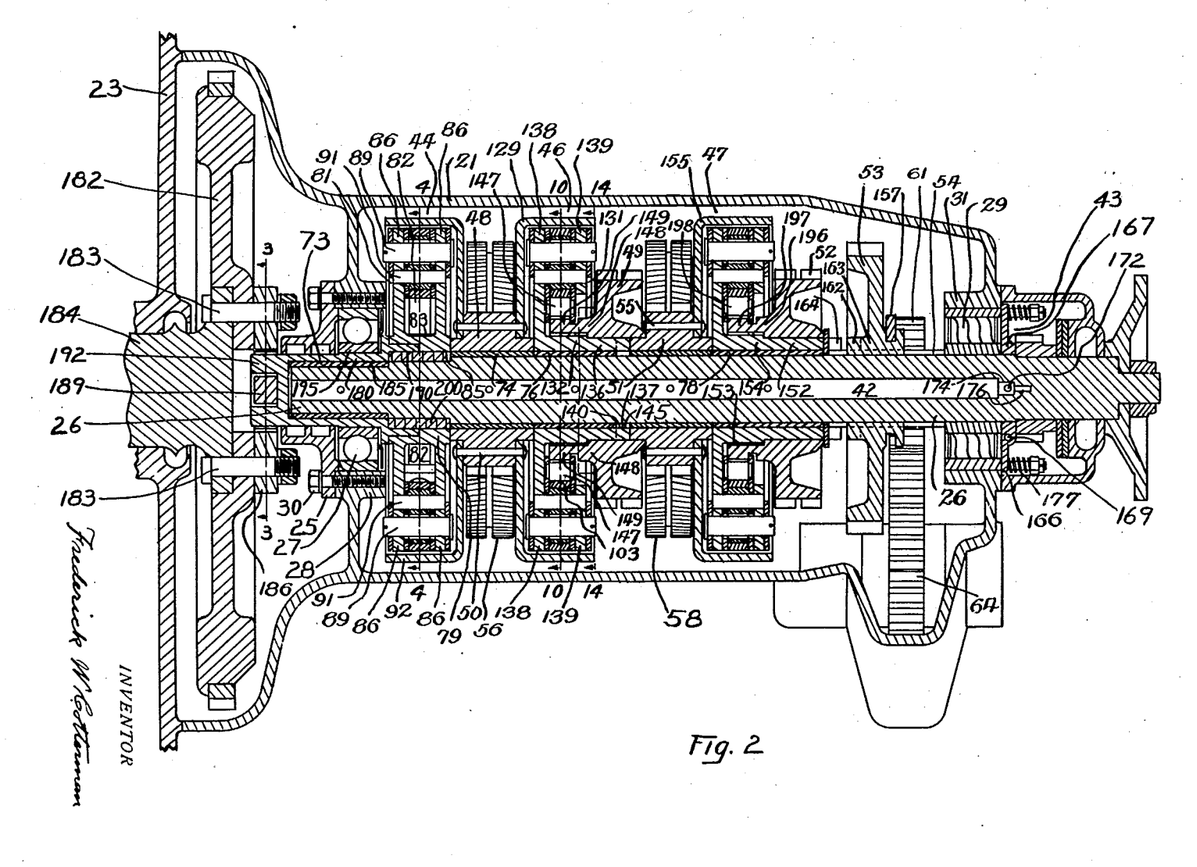
Fig. 2 is a longitudinal horizontal section of the transmission mechanism taken through the axis of the drive shaft.
Figures 3, 4, 8, 9, 10:
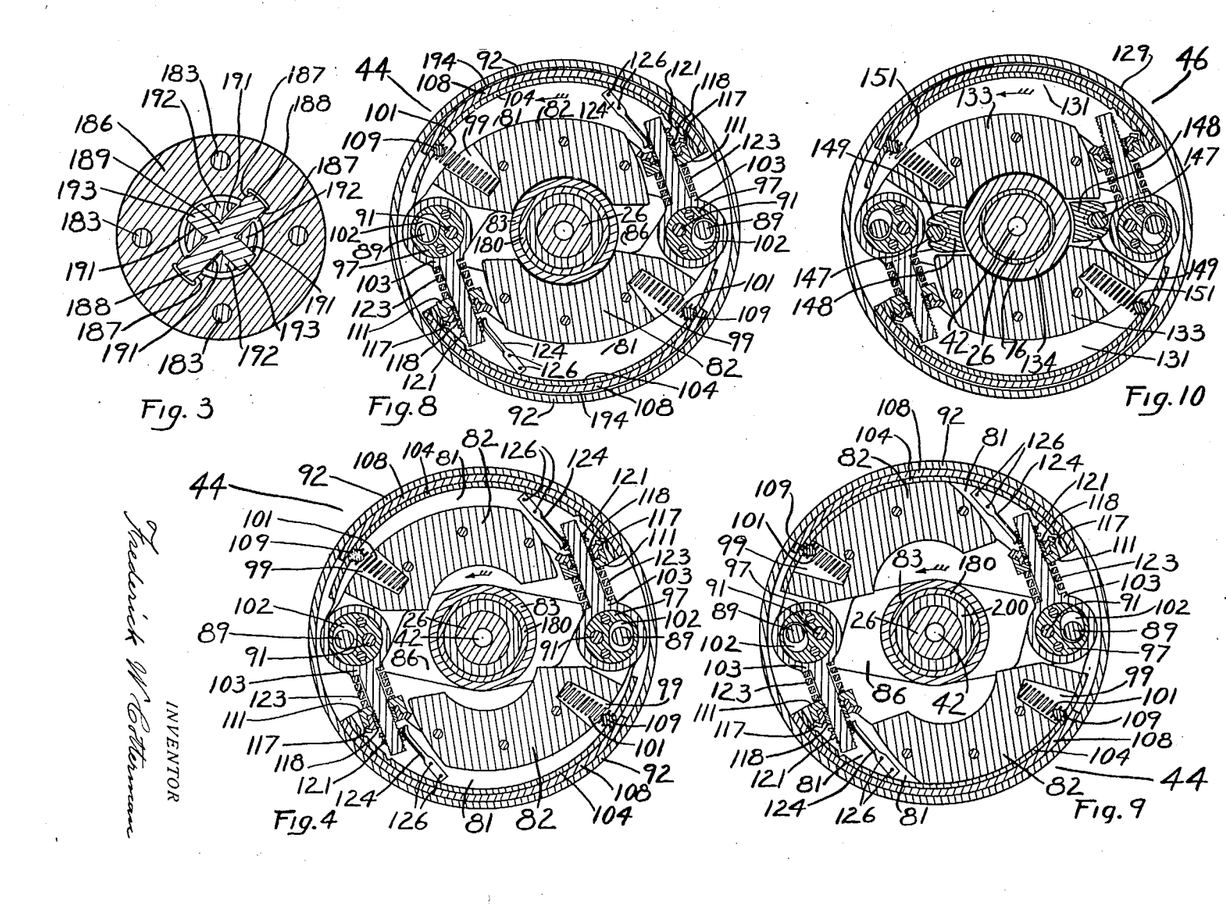
Fig. 3 is a transverse section of the coupling mechanism which connects the engine to the transmission mechanism; the section being taken at 3—3 of Fig. 2.
Fig. 4 is a transverse section of the low speed clutch taken at 4—4 of Fig. 2.
Figs. 8 and 9 show transverse sections taken on the same plane as Fig. 4 but with the clutching mechanism operated to different positions.
Fig. 10 is a transverse section of the intermediate speed clutch taken at 10—10 of Fig. 2 but in its unoperated state.
Figure 5:
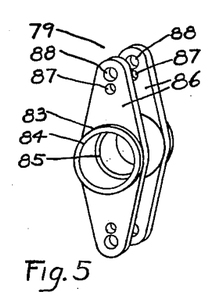
Figs. 5, 6 and 7 show parts of the low speed clutch mechanism disassembled.

The low speed clutch 44 appears in axial sections in Figs. 1 and 2 and in transverse section in Fig. 4, all showing the clutch in engagement. Clutch 44 comprises the carrier 79 shown in detail in Fig. 5, the clutch shoes 81, shown in detail in Fig. 7, and the clutch operating weights 82 shown in detail in Fig. 6. Carrier 79 (see detail view Fig. 5) comprises a hub portion 83 bored to two inside diameters 84 and 85. Four arms 86 extend outwardly from the hub 83. These arms each have hinge pin holes 87 and 88. The shoes 81 straddle the arms 86 and are hinged thereto by the hinge pins 89 while the weights 82 are supported between the arms 86 and are hinged thereto by the hinge pins 91. The mechanism is such that the free ends of the shoes 81 are operated outwardly into contact with the clutch drum 92 when the weights 82 are swung outwardly on their hinge pins 91 by centrifugal force.

Figure 6:
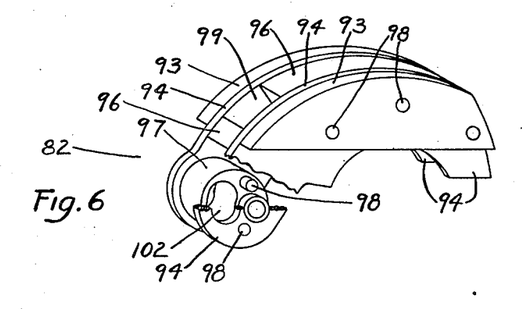

Each clutch operating weight is made up as shown in Fig. 6 of two outer plates 93, two intermediate plates 94 one of which is drawn with a part broken away to more clearly show the eccentric between them, a middle plate 96 and the eccentric 97, all held together by the rivets 98. A pocket 99 is cut into the middle plate 96 for the spring 101 shown in Fig. 4. The eccentric 97 as well as the intermediate plates 94 has an oval clearance opening 102 which permits limited movement of the eccentric 97 about the hinge pin 91, (see Fig. 4) without interfering with the shoe hinge pin 89. The connecting rods 103 (see Fig. 4) are necessarily put around the eccentrics 97 before the eccentrics are riveted between the plates 94.

Each clutch shoe 81 (see Fig. 7) is made up of a bent metal rim 104 and two curved side plates 106 tenoned into the rim 104 as at 107 and preferably welded together on the inside corners. A facing 108 of friction material is secured to the outside of the rims 104. A stud 109 is riveted into rim 104 to support the outer end of spring 101 (see Fig. 4). Holes 112 are provided in side plates 106 (see Fig. 7) for the hinge pins 89 (see Figs. 2 and 4). A block 111 swivels on integral trunnions 113 between the two side plates 106. Block 111 has a central hole 114 (see Fig. 7) to receive the connecting rods 103 (see Fig. 4). Hole 114 is counterbored from the top downward at 116 to receive the hub of the adjusting gear 117 which has a hexagonal hole containing the adjusting nut 118 (see Figs. 16 and 17). Another hole 119 in the side plate 106 provides rotative bearing for the adjusting pinion 121. A hexagonal opening 122 (see Figs. 14 and 16) through pinion 121 is provided for the insertion of a hexagonal adjusting key. A heavy spring 123 draws the nut 118 downward with considerable force against the block 111. The nut 118 is prevented from turning because it is hexagonal and fits slidably in the hexagonal hole through the hub of the gear 117. A pinion retaining spring 124 is held to the side plate 106 by rivets 126 (see Fig. 4) extending through holes 127 (see Fig. 7). The block 111 necessarily is put between the plates 106 before they are welded to the rim 104. The construction of the intermediate clutch will now be described.

The construction of the intermediate clutch

Figure 11:
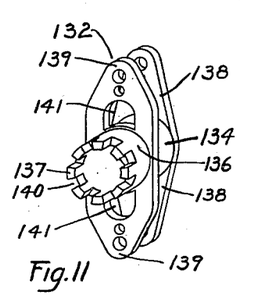
Figure 13:
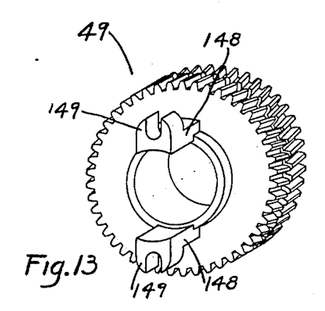
Fig. 13 is a detail view in perspective of the gear, which operates the intermediate clutch mechanism.

In the intermediate clutch 46 the drum 129 and the shoes 131 are precisely like those in the low speed clutch 44. But the carrier 132, and the clutch weights 133 are different. The carrier 132 (see detail view Fig. 11) comprises the hub 134 with the tubular extension 136 having the jaws 137 at the ends separated by spaces 140. Jaws 145 on the end of gear 51 fit snugly into the spaces 140 of carrier 132 so that the carrier 132, the gear 51 and the clutch drum 155 must always rotate in unison. Two arms 138 and two wider arms 139 extend from the hub 134. The wider arms 139 have holes 141 extending therethrough for a purpose which will presently appear. The clutch shoes 131 and the clutch operating weights 133 are hinged to the outer ends of the arms 138 and 139 in the same manner and with the same kind of hinge pins as they are in the low speed clutch 44. The intermediate clutch weight 133 shown in detail in Fig. 12 differs from the high speed clutch weight 82 only in that the intermediate plates 143, one of which has a portion broken away for clearness, have ears 144 carrying the stud 147 the purpose of which will presently be described. The gear 49, which may be termed the clutch operating gear, because of the influence it has in the operation of the intermediate clutch, is shown in detail in Fig. 13. Gear 49 has two arms 148 extending laterally therefrom. Each arm 148 has a fork 149 extending radially at the outer end. In the transverse section Fig. 10 the studs 147 are shown in their operative position between the prongs of the forks 149 of the gear 49.

By reference to the transverse sections Fig. 4 and Fig. 10 it will be seen that the essential difference between the low speed clutch 44 and the intermediate clutch 46 is that, in the low speed clutch 44 the clutch operating weights 82 are restrained against outward movement by the springs 101 only, while the weights 133 of the intermediate clutch 46 are restrained against outward movement not only by similar springs 151, but in addition thereto they are restrained by the forks 149 of the gear 49 acting on the studs 147, this latter restraint being equal to the entire torque load which is being transmitted by the gear 49. The high speed clutch 47 is in every way a duplicate of the intermediate clutch 46 except that the tubular extension 152 (see Figs. 1 and 2) of the hub 153 of the carrier 154 is slightly longer in the high speed clutch 47. In all other respects they are alike in structure and operation.

It will be seen that there are two automatic units, the intermediate speed unit and the high speed unit. Each unit comprises a driving member and driven mechanism. The driven mechanism is connectible to the driving member either directly by clutch, or at a reduced speed by gearing. In the intermediate unit the driving member is the drum 129 to which the gear 48 is attached, while the driven mechanism comprises the gear 49, the carrier 132, and the weights 133 and shoes 81 supported on the carrier. It will be seen that the driven mechanism comprises two elements, the gear 49 which receives power, and the carrier 132 from which power is taken off for the next or high speed unit. These two elements of the driven mechanism are so connected that one revolves the other. But the carrier 132 may at any time gain or lose a small fraction of a revolution with respect to the gear 49, this gain or loss being occasioned by the outward or inward movements of the weights 133 from or toward the axis of rotation when engaging or disengaging the clutch 46.

When, therefore, it hereinafter becomes necessary to distinguish between these two elements of the driven mechanism the driven gear 49 may be referred to as the power receiving element, while the carrier 132 may be referred to as the power take-off element.

The construction of the reversing mechanism

The spur gear 53 is operable axially on the splines 54 of the drive shaft 26 by the gear shift lever 156 (see Fig. 1) which engages the forked arm 157 on the rod 158. Rod 158 has the customary notches 159 wherein the detent ball 161 may seat to detain the rod in the several operative positions. These notches are so placed in the rod 158 that the teeth 162 on the hub 163 of the gear 53 will engage the teeth 164 on the tubular extension 152 of the carrier 154 when the rod is shifted to one extreme, while at the other extreme the teeth of the gear 53 will be in mesh with the teeth of the idler gear 64, and in the neutral position of the rod, which is the position shown in Fig. 1, the gear 53 and consequently the shaft 26 is freed from all gear connections.

The construction of the drive shaft oiling mechanism

The oiling mechanism 43 (see Figs. 1, 2 and 19) comprises a plate 166 having a hub 167 which is a snug running fit on the drive shaft 26. Hub 167 has an internal circumferentially extending pocket 168 running one-third of the way around it in the lower portion. A vertical oil hole 169 through a rib 171 communicates with the pocket 168. The shaft 26 has three equally spaced radial oil holes 172, one of which always connects the central supply opening 42 with the pocket 168, and three equally spaced radial air holes 173 (see Fig. 1) extending from the oil supply opening 42 outwardly through the shaft. It will be noticed that the oil supply opening 42 is decreased in diameter once at 174 and again at 176. The plate 166 is held against the hub 31 by the springs 177. An oil reservoir 178 is provided at the top of the housing 21 by the rib 179 extending across the housing. Reservoir 178 is kept filled by the splash system and communicates with the vertical oil hole 169 through the transverse oil hole 181 (see Fig. 19). The cover 22 slopes downwardly toward the reservoir 178 and conveys the oil which is splashed against it to and into the reservoir.

Referring to Fig. 1 it will be noticed that the engine flywheel 182 does not carry the usual pedal operated clutch, and that the entire mechanism for connecting the engine in driving relation with the vehicle is contained in the transmission housing 21.

The bolts 183 which secure the flywheel 182 to the crankshaft 184 are made long enough to reach through and secure a coupling plate 186 to the flywheel (see Fig. 3). Plate 186 has two keyways 187. The longer legs 188 of a cross shaped member 189 are slidably fitted to the keyways 187.

Figure 20:
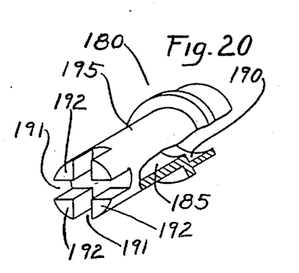
Fig. 20 shows the low speed clutch driving sleeve in detail.

The low speed clutch driving sleeve 180, shown in detail with a part broken away in Fig. 20, conveys power from the flywheel 182 to the low speed clutch 44 within the housing 21. The driving sleeve 180 is bored to two diameters 185 and 190, the outside 195 being press fitted to the ball bearing 27. The end has four slots 191 leaving four jaws 192 (see Fig. 20). The long legs 188 of the cross shaped member 189 are made to clear two of the slots 191 (see Fig. 3), but the short legs 193 of the cross shaped member 189 are slidably fitted to the other two slots 191. The cross shaped member 189 provides driving connection between the coupling plate 186 and the driving sleeve 180, and allows for considerable misalignment between the axis of the crank shaft 184 and the axis of the sleeve 180, thus permitting the crank shaft bearing caps of the engine to be taken up without having to realign the transmission with the engine. A spring ratchet 200 fitted snugly to bores 190 of the sleeve and 85 of the carrier permits the sleeve 180 to revolve slower, but not faster, than the clutch 44, thus providing free wheeling for the vehicle.

The operation of the transmission mechanism may be more readily described if definite power and speed values are assumed for the engine. Accordingly, for illustrative purposes only, it will be assumed that the flywheel 182 is part of a six cylinder engine of one hundred sixty cubic inches displacement capable of developing fifty brake horse power at thirty-six hundred R. P. M. Such an engine may be made to run at an idling speed of three hundred R. P. M. Its maximum torque may be transmitted by a clutch in which the combined area of the two facings 108 is twenty-one square inches when these facings are pressed outwardly against the drum 92 with a total pressure of six hundred pounds applied to each shoe 81. This may be accomplished if the clutch operating weights 82 are of two pounds each. With these values assumed the operation of the low speed clutch may be described as follows:—

*The operation of the low speed clutch*

Since the low speed clutch carrier 79 revolves at engine speed, the shoes 81 and the weights 82, being hinged thereto, also revolve at engine speed. The springs 101 are of such strength that they keep the weights 82 pressed tightly against the hub 83 as shown in Fig. 8 until a speed of five hundred R. P. M. is reached, at which speed the centrifugal force of a two pound weight, the center of gravity of which is two inches from the axis of rotation, is nearly thirty pounds. This thirty pounds just overcomes the spring 101 and the weights move outwardly until their center of gravity is two and one-half inches from the axis of rotation as shown in Fig. 4 instead of two inches as formerly. This greater distance from the axis of rotation increases the centrifugal force of a weight 82 from thirty pounds to thirty-seven pounds without any change in speed. Each weight 82 then, at five hundred R. P. M., exerts an outward pressure, in excess of that necessary to overcome the springs 101, of seven pounds.

Now when the weights 82 swing outwardly from the positions shown in Fig. 8 to the positions shown in Fig. 4, the eccentrics 97 are turned on their hinge pins 91, moving the connecting rods 103 against the springs 123 thus forcing the shoes 81 against the drum 92 taking up the spaces 194, Fig. 8, between the facings 108 of the shoes 81 and the drum 92. The ratio of movement of the weights 82 to the movement of the shoes 81 is ten to one, so that while the weights moved outwardly one-half inch the shoes moved only one-twentieth inch. With this leverage in effect the seven pounds which the weights exert outwardly puts a pressure of seventy pounds between each facing 108 and the drum 92. This amount of pressure between the facings 108 and the drum 92 is not sufficient to carry the maximum torque of the engine, but at this low speed the engine does not deliver its maximum torque, and inasmuch as centrifugal force builds up rapidly, being proportioned to the square of the number of revolutions, it will be found that at six hundred R. P. M. of the engine each clutch facing 108 is engaged with the drum 92, with a pressure of two hundred twenty pounds, at seven hundred engine R. P. M. the outward pressure on each facing 108 is four hundred pounds, and at eight hundred engine speed the outward pressure on each facing is six hundred pounds or just enough to transact the full torque which the engine is capable of delivering.

Now as is well known, and as before stated, the centrifugal force of the revolving weights builds up very rapidly, being proportional to the square of the revolutions, and this fact is of great advantage in the operation of the clutch up to the speed of about eight hundred seventy R. P. M. At this speed each facing 108 is pressed against the drum 92 with a pressure of eight hundred pounds. But as hereinbefore stated, the engine herein selected for illustration has a maximum speed of thirty-six hundred R. P. M., so that, calculated by the same rule, when the engine attained this maximum speed the pressure between each facing 108 and the drum 92 would be eighteen thousand four hundred pounds. Such a pressure is excessive and is more than a clutch drum of ordinary thickness would withstand and this fact requires that some means be provided to prevent the building up of this excessive pressure at these high speeds.

The arrangement of parts by which the building up of this high clutch engagement pressure is prevented is considered one of the novel features of this invention. This arrangement consists of interposing the heavy spring 123, which will yield to a pressure of about eight hundred pounds, between the connecting rods 103 and the block 111. With these springs 123 so interposed, the pressure between the facings 108 and the drum 92 will not build up at the same rate of increase after eight hundred seventy R. P. M. of the engine.

In Fig. 9 is shown the arrangement which the several parts of the low speed clutch take at about nine hundred R. P. M. of the engine. It will be here seen that the weights 82 lie closely to the interior of the shoes 81 and that the hexagonal nut 118 is raised slightly from the block 111. When the speed is again decreased until the weights 82 change from their position shown in Fig. 9 to that shown in Fig. 4, the springs 123 expand and the hexagonal nuts 118 seat themselves on the blocks 111. Further decrease in speed draws the hexagonal nuts 118 toward the eccentrics 97 thus drawing the facings 108 away from the drum 92 leaving spaces 194 between as shown in Fig. 8. In this position the engine may idle, revolving the weights 82 and shoes 81, but not revolving the drum 92 with them. When adjustment of the space 194, Fig. 8 is advisable it may be made by inserting a hexagonal key in the hexagonal opening 122 in the pinion 121 and turning the nut 118 by means of the pinion 121 and the gear 117. The spring 124 maintains this adjustment once it is made.

The operation of the intermediate clutch under no load

When the engine revolves about five hundred R. P. M. and the low speed clutch 44 goes into engagement, the gear 48 (see Fig. 1) will of course revolve at engine speed and this movement will be imparted through gears 56, 57 and 49, then through arms 148 (see Fig. 2) and forks 149 to studs 147 to the weights 133 (see Fig. 1) which are thereby drawn tightly to the hub 134 (see Fig. 10), after which the carrier 132 is thereby revolved, thus revolving the shoes 131 at half engine speed within, but not in contact with, the drum 129 which is revolving at engine speed. Inasmuch as the carrier 132, the gear 51, and the drum 155 are all secured together, all of them must revolve at half engine speed (see Fig. 1). The half engine speed movement of gear 51 is transmitted from one to the next through gears 58, 59 and 52, then through the arms 196 (see Fig. 2), the forks 197, the studs 198, the weights 199 (see Fig. 1), drawing the weights tightly against the hub 153, in a manner similar to that shown in Fig. 10, thus revolving the high speed clutch carrier 154 and the shoes 201 at half the speed of the intermediate clutch carrier 132 which would of course be at one-fourth engine speed. The carrier 154 revolving at one-fourth engine speed is within, but does not touch, the drum 155 which is revolving at one-half engine speed. If now, previous to bringing the engine up to five hundred R. P. M. the teeth 162 on the reversing gear hub 163 have been shifted into mesh with the teeth 164 of the carrier 154, the shaft 42 will be driven at one-fourth engine speed, or at one hundred twenty-five R. P. M. which would drive the vehicle at about two miles per hour. In this condition the transmission is said to be in low gear.

Now as long as the engine speed is not increased beyond five hundred R. P. M. no change in the gear ratio takes place, but when the engine speed is raised to one thousand R. P. M. the drum 129 revolves one thousand R. P. M. and the shoes 131 revolve five hundred, the drum 155 revolves five hundred and the shoes 201 revolve two hundred fifty and the vehicle travels four miles per hour although still in low gear.

Operation of transmission under zero load

Now while thus in low gear if the vehicle is on a slight down grade so that it requires no help from the engine, the weights 133 will not be restrained by the arms 148 of the gear 49 but by the spring 151 only so that the five hundred R. P. M. of the weights 133 will engage the clutch 46 whereupon the transmission will be in intermediate gear which means that the three drums 92, 129 and 155 are revolving in unison, the gears 48, 56, 57 and 49 are inoperative, and the weights 199 are revolving at one-half instead of one-fourth engine speed. When this takes place the vehicle cannot instantly raise its speed from four to eight miles per hour, so the engine speed drops from one thousand to five hundred R. P. M. and whereas an instant before one thousand engine R. P. M. in low gear produced four miles per hour now five hundred engine R. P. M. in intermediate gear produces four miles per hour.

The operation of the high speed clutch under no load

When, with the transmission in intermediate gear, the engine again reaches one thousand R. P. M. and the vehicle consequently moves eight miles per hour, and the vehicle is still on the same down grade so that the arms 196 of the gear 52 offer no restraining influence on the weights 199, the high speed clutch weights, now revolving five hundred R. P. M. will overcome the weight restraining springs 151 and engage the high speed clutch 47, whereupon the transmission will be in high gear, which means that each and every member surrounding the drive shaft 42 will revolve in unison with it, and all gears will be ineffective to transmit power. When this happens the vehicle cannot instantly raise its speed from eight to sixteen miles per hour, so the vehicle remains at eight miles per hour and the engine again drops to five hundred R. P. M.

The foregoing condition in which the transmission is operative under zero load condition will not likely often be realized except where the vehicle overruns the engine, and was described merely to show the vastly different effect which other load conditions will create. It is, however, considered an advantage to have the clutches 46 and 47 engage when passing beyond, and disengage when going below, a predetermined speed, even though there is at the time no torque load urging such clutch operation, because at zero load the clutches will eliminate the gear drive at a very low speed yet will be always set for gear drive after a stop has been made. The strength of the spring 151 determines the speed at which the clutches will shift under zero load.

The operation of the intermediate and high speed clutches under full load

Assuming again for illustrative purposes that the engine has been accelerated from its idling speed of three hundred R. P. M. to five hundred R. P. M., the speed at which the low speed clutch engages, and the vehicle moves two miles per hour and at this stage fuel is being fed to the engine in sufficient amount to produce its maximum torque which will of course result in the vehicle being rapidly accelerated from the two miles per hour to a higher speed. But this maximum engine torque is being transmitted from the gear 49 to the gear 51 by the arms 149, which, to transmit this torque, must first draw the weights 133 against the hub 134, thus assisting the springs 151 to keep the shoes 131 away from the drum 129. By calculation it may readily be found that, with an engine of the size herein assumed for illustrative purposes exerting its maximum torque on the arms 148 the vehicle must reach a speed of twelve miles per hour in low gear before the intermediate clutch 46 will engage to bring in the intermediate gear, and when intermediate speed is in effect, and the engine exerting its maximum effort to accelerate the vehicle, the high speed clutch does not engage until the vehicle has attained a speed of twenty four miles per hour. By similar calculations it may be found that when the engine is being operated at one-half its full load capacity the shift from low gear to intermediate gear takes place at ten miles per hour and from intermediate gear to high at twenty miles per hour, and when the engine is being operated at one-fourth its full load capacity the shift from low to intermediate takes place at eight miles per hour and from intermediate to high at sixteen miles per hour.

It will thus be seen that because of the fact that the gears 49 and 52 transmit their loads through the clutches 46 and 47 and in doing so tend to keep them disengaged, and because of the fact that the weights 133 and 199 oppose the gears and tend to engage the clutches, the shift from any one gear ratio to a higher ratio takes place, not at any fixed engine speed, nor at any fixed vehicle speed, nor at any fixed torque load, but at such a time as the power which the engine can develop, from the fuel being fed to it, exceeds the resistance of the vehicle, and this resistance may vary according to whether the vehicle is being accelerated or decelerated or whether it is going up grade or down.

In the beginning it was stated to be one of the objects of this invention to so construct and arrange the mechanism that when the automatic clutches started to engage they would almost instantly be engaged fully, so as to minimize wear. Also that widely different load conditions would be required to disengage the clutches than were required to engage them, in order that a condition might not be had where, over an extended period of time, a load varying but slightly on either side of the clutch engaging load might not alternately and too frequently engage and disengage the clutch. The manner in which this object is attained may be more readily illustrated, by assuming the same engine capacity and the same clutch operating weights and corresponding shoe engaging pressures as was hereinbefore assumed for illustrative purposes.

When the engine R. P. M. has reached five hundred and the low speed clutch 44 has become engaged, the intermediate clutch drum 129 revolves five hundred R. P. M. and the shoes 131 and weights 133 are revolved two hundred fifty R. P. M. through the gearing with the entire load which is being transmitted by the gear 49 opposing the movement of the weights 133 to engage the clutch. If now fuel is suddenly fed to the engine in such quantity as to constantly keep it at its maximum power the vehicle will be rapidly accelerated, more or less rapidly of course depending on whether it is going up or down grade. With the power factor constant then, the time which will be consumed in reaching a clutch engaging condition will depend on the grade. When, in spite of the resistance, whatever it may be, this maximum power has accelerated the vehicle until the weights 133 revolve about fifteen hundred R. P. M., which is at about three thousand engine R. P. M., and at about twelve miles per hour vehicle speed, a two pound weight 133 will be exerting an outward force of about two hundred sixty pounds which is opposed by a restraining force of thirty pounds due to the spring 151 and a restraining force of two hundred thirty pounds due to the load on gear 49 exerted through the arms 149 on the weight 133. The centrifugal force tending to move the weight 133 out, and the other two restraining forces tending to keep the weight in, are now balanced, so that at the slightest increase in speed the weight will move from the position shown in Fig. 10 to that shown in Fig. 14. But when this happens the weight 133 is twenty-five percent farther from the center of rotation than before and consequently exerts twenty-five percent greater outward force, which would then be three hundred twenty-five pounds outward force of the weight as against two hundred sixty restraining it and this occurs almost instantly without any change in R. P. M. of the weights.

Now the weights will be exerting an outward force of sixty-five pounds more than that which restrains them and since this is multiplied by ten by the linkage connecting the weight 133 to the shoe 131, there is now a pressure of six hundred fifty pounds between each shoe 131 and the drum 129. Instantly this pressure is applied to the shoes 131, the drum 129, which was an instant before running at double the speed of the shoes now reduces its speed, and with it the speed of the engine to that of the shoes, since it is easier to instantly bring the R. P. M. of the engine down one-half than to instantly double the miles per hour of the vehicle.

But the instant that this happens and the drum 129 and the shoes 131 are thereby revolved in unison, all load is removed from the gear 49, because the carrier 132 now revolves at engine speed whereby gear 51 is driven directly at engine speed by the carrier 132 and independently of the gear 49. With the load thus removed from the gear 49 there is a restraint of two hundred thirty pounds removed from the weight 133 so that whereas an instant before the outward force of the weight which was three hundred twenty-five pounds was opposed by thirty pounds spring restraint and two hundred thirty pounds gear restraint, the three hundred twenty-five pounds weight force is now opposed only by thirty pounds spring restraint, all gear restraint having been removed by the engagement of the shoes 131 with the drum 129.

Figures 14, 15, 16, 17, 18, 19:
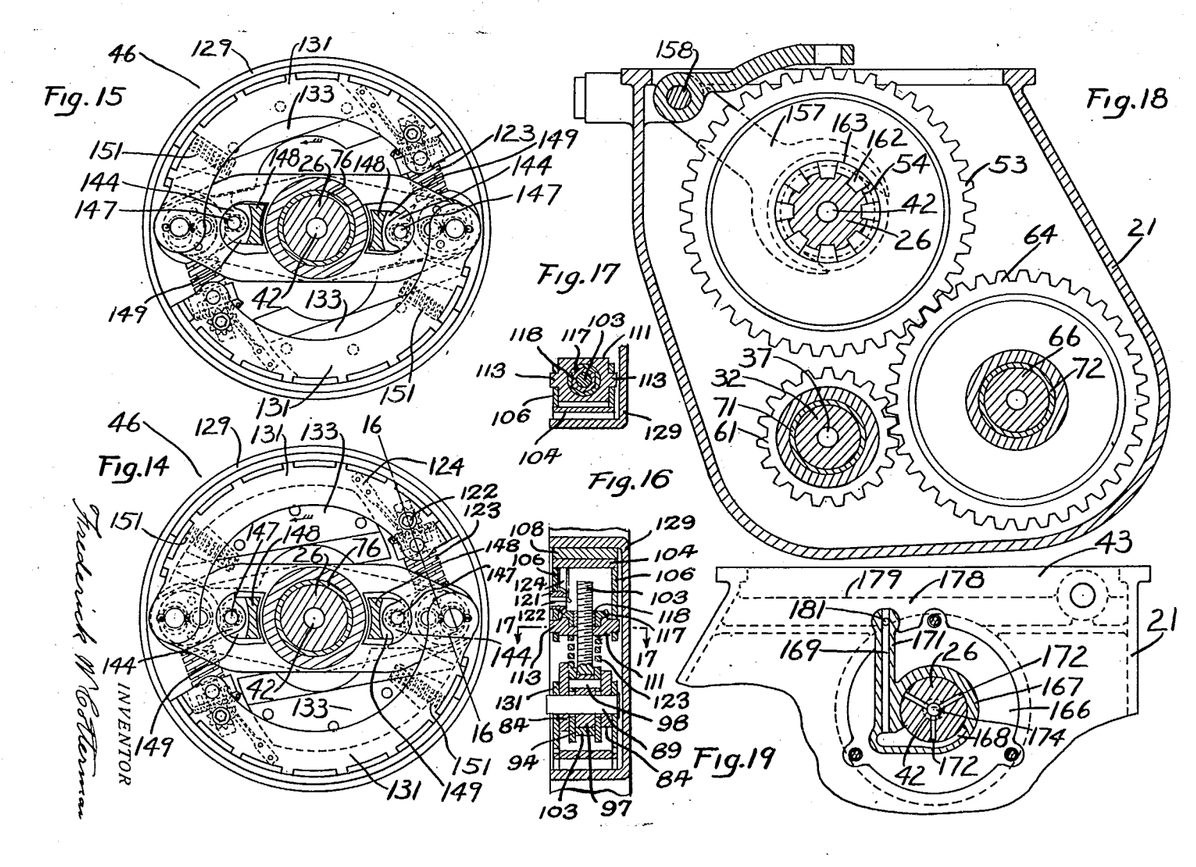
Fig. 14 is a transverse section through the mechanism taken at 14—14 of Fig. 2 showing the intermediate speed clutch mechanism in elevation as it appears when it is in its unoperated state.
Fig. 15 shows an elevation of the same mechanism as Fig. 14 but with the clutching mechanism operated to a different position.
Fig. 16 is a section taken at 16—16 of Fig. 14.
Fig. 17 is a section taken at 17—17 of Fig. 16.
Fig. 18 is a transverse section taken at 18—18 of Fig. 1 showing the reversing gear.
Fig. 19 is a fragmentary section taken at 19—19 of Fig. 1 showing oiling mechanism.

There is then left at this instant an excess of two hundred ninety-five pounds weight force which would exert twenty-nine hundred fifty pounds between each shoe 131 and the drum 129 if it were not for the fact that the springs 123 will yield at eight hundred pounds whereupon the weights 133 seat themselves against the inside of the shoes 131 as shown in Fig. 15. The transmission is now in intermediate gear, the power is being transmitted at engine speed as far as the gear 51, then through gears 58, 59, 52 and 53 to the drive shaft 26 which now revolves at half engine speed. The gears 56, 57 and 49 carry no load and since the gear 49 as well as the gear 48 revolves at engine speed, the gear 57 revolves faster than the gear 56 which it may do because of the ratchet 62.

As before stated the shift from low gear to intermediate gear took place at three thousand engine R. P. M. and at twelve miles per hour vehicle speed and when the shift took place the vehicle speed remained at twelve miles per hour and the engine speed reduced itself from three thousand R. P. M. to fifteen hundred R. P. M. It is obvious that, since the gear 51 is now revolving at engine speed, if the engine is continued at maximum effort the same process will repeat itself through the gears 58, 59, 52 and the clutch 47 which are duplicates of the intermediate set. When then the engine again is able to reach three thousand R. P. M. in spite of the resistance, at which speed the vehicle will move twenty-four miles per hour in intermediate gear, the shift of the clutch 47 takes place and the engine will be again reduced to fifteen hundred R. P. M. and the vehicle will be moving twenty-four miles per hour in high gear, in which state all members on the shaft 26 revolve in unison with it.

It remains to be set forth by what means a centrifugal clutch which becomes engaged at a given speed when carrying a given load will not become disengaged at a slightly lesser speed when carrying the same load.

As hereinbefore indicated the instant before the clutch 46 is engaged, its engagement is opposed by the entire torque load being carried by the gear 49, while at the instant the clutch is engaged all restraint of the weight 133 due to the gear 49 is removed. It follows that the same gear restraint which opposed engagement of the clutch does not assist disengagement, but disengagement may be effected only when the centrifugal force of the weight 133 no longer exceeds the restraint of the spring 151 by any more than enough to put six hundred pounds pressure between the shoes 131 and the drum 129.

Thus whenever the transmission is in intermediate gear the clutches 44 and 46 are engaged and both are revolving at engine speed. The weights 133 are of course revolving at engine speed with nothing opposing the centrifugal force except the springs 151. Assume now that the engine is still being fed fuel sufficient to keep it at its maximum torque but that the grade being climbed by the vehicle is sufficiently steep to gradually reduce the speed of the vehicle in spite of the fact that the maximum torque of the engine is being used. When now the engine speed is forced down to eight hundred R. P. M. which in intermediate gear is at a vehicle speed of six and one-half miles per hour a weight 133 will be exerting only ninety pounds outwardly which is opposed by a spring 151 offering thirty pounds resistance leaving a weight bearing outwardly with an excess of sixty pounds which produces a pressure of six hundred pounds between a clutch shoe 131 and the drum 129. It was before stated that to transmit the maximum torque there should be a pressure between the clutch shoe and drum of six hundred pounds. Therefore when the pressure is reduced, as it now is, to six hundred pounds the slightest further decrease in speed will cause the clutch to slip. But the instant it slips slightly, the load is allowed to be taken up by the gears 56, 57 and 49, and upon the instant that the gear 49 assumes the load its arms 149 effect complete disengagement of the clutch. When the intermediate clutch 46 is thus again disengaged the engine will immediately double its speed to sixteen hundred R. P. M. and drive the vehicle at the same speed, namely six and one-half miles per hour, in low gear. By a similar calculation it will be found that when the transmission is once in high gear and the maximum torque is being applied it will not again shift into intermediate gear until the load has pulled the engine speed down to eight hundred R. P. M. which in high gear is at a vehicle speed of thirteen miles per hour.

A summary of the foregoing shows that when maximum engine effort is applied the transmission will automatically shift from low to intermediate at twelve miles per hour, and from intermediate to high at twenty-four miles per hour, but will not shift from high back to intermediate until reduced by load to thirteen miles per hour and will not shift back from intermediate to low until reduced by load to six and one-half miles per hour.

The summary also discloses that when one-half of the maximum engine effort is applied the transmission will automatically shift from low to intermediate at ten miles per hour and from intermediate to high at twenty miles per hour, but will not shift from high back to intermediate until reduced by load to ten miles per hour and will not shift back from intermediate to low until reduced by load to five miles per hour.

The summary further discloses that when one-fourth of the maximum engine effort is applied the transmission will automatically shift from low to intermediate at eight miles per hour and from intermediate to high at sixteen miles per hour, but will not shift from high back to intermediate until reduced by load to eight miles per hour and will not shift back from intermediate to low until reduced by load to four miles per hour.

Figures 7, 12, 21:
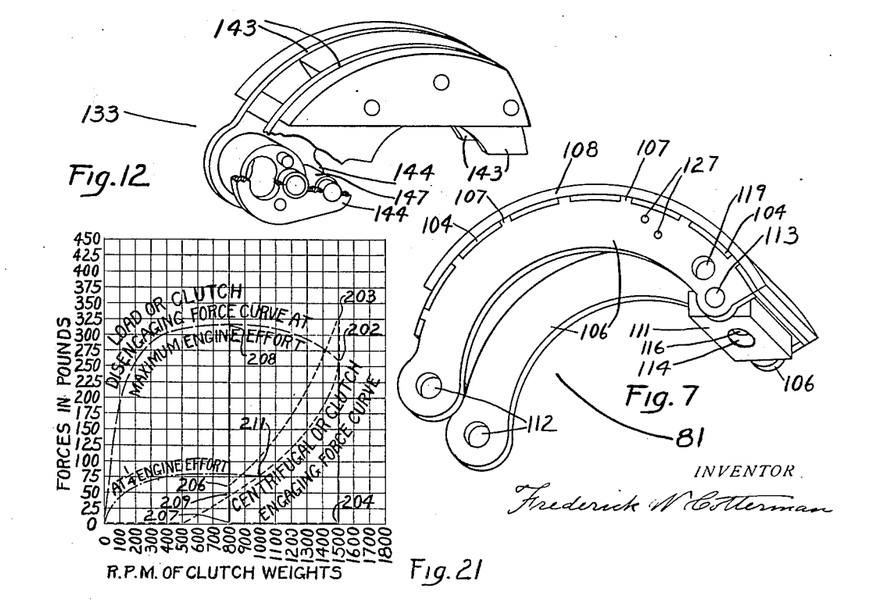
Figs. 11 and 12 show parts of the intermediate speed clutch mechanism disassembled.
Fig. 21 is a diagram illustrative of the operation of the transmission mechanism.

The diagram Fig. 21 shows curves representing the centrifugal or clutch engaging force of a two pound clutch operating weight at different R. P. M. and the resistance offered to its operation by the load or clutch disengaging force, at corresponding R. P. M., the dotted line being the centrifugal or clutch engaging force curve and the dash line the load or clutch disengaging force. As hereinbefore stated, at five hundred R. P. M. of the clutch the outward force of the weight 133 just balances the resistance of the spring 151 and is consequently beginning to exert a force against the load resistance offered to the weight by the arms 148 of the gear 49. But at this clutch speed, five hundred R. P. M., the diagram shows that the disengaging force is already three hundred ten pounds. Now, as is well known, the torque curve of an engine of the size and kind herein designated for illustrative purposes begins to drop at about sixteen hundred R. P. M. and since the clutch speed is one-half engine speed the load or clutch disengaging force curve in the diagram naturally begins to drop at about eight hundred R. P. M., but the centrifugal force curve rises rapidly after six hundred R. P. M. and, as the diagram shows, the rise of the centrifugal or clutch engaging force curve and the drop of the load or clutch disengaging force curve cross at fifteen hundred R. P. M. clutch speed, which is three thousand engine speed. When these lines cross as at 202 the clutch engages, and now since, to engage the clutch, the clutch weights move twenty-five per cent farther from their axis of rotation than they were an instant before, the clutch weight force immediately, without any change of speed, goes up from two hundred sixty pounds as at 202 to three hundred twenty-five pounds as at 203, and, because the load is removed from the gear 49, the disengaging force, without any change in speed, drops from two hundred sixty pounds to zero as at 204.

If now at this instant a grade is encountered which decelerates the vehicle in spite of the fact that the maximum power of the engine is being applied, the clutch engaging force decreases with the decrease in speed until, when the clutch speed is reduced to eight hundred R. P. M., the force of the clutch weight is only sixty pounds as at 206. Since sixty pounds outward force on the weight results in six hundred pounds force between the shoe and the drum, the slightest further decrease in speed of the clutch weights will allow the clutch to slip, and the instant the clutch slips the load is thrown on the gear 49. When this happens the opposing or clutch disengaging force increases from zero pounds as at 207, to three hundred fifteen pounds as at 208, while the weight force drops from sixty pounds as at 206 to forty-eight pounds as at 209 and the clutch is of course disengaged because the disengaging force now so greatly exceeds the engaging force.

The diagram Fig. 21 is illustrative of the operation of the intermediate speed clutch 46 and of the high speed clutch 47 and from the diagram it is apparent that when either of these clutches starts to engage they at once engage fully, and when they start to disengage they at once disengage fully. It is also apparent that when once engaged a considerable reduction in speed is necessary before they will again disengage, and that no load condition may occur whereby a clutch is for any extended period of time only partially engaged, a condition which would permit slippage and rapid wear. It is also apparent that when a clutch engages the engaging force at once greatly exceeds the disengaging force and that when the clutch disengages the disengaging force at once greatly exceeds the engaging force.

The diagram Fig. 21 represents the clutch operation when the engine is kept at maximum effort, and properly illustrates the clutch action regardless of the magnitude of the vehicle resistance which is being overcome, for, if the vehicle resistance is normal, as obtains on a level road, the number of seconds of time which is required for the full power of the engine to accelerate to a clutch engaging speed is less than would be required when the vehicle resistance was great, as on a steep incline.

Of course it will be understood that a given vehicle resistance may be opposed by the full power of the engine, or it may be opposed by part only of its power, and it will be understood that when part only of the engine power is employed the point of clutch engagement will shift from 202 to some other point on the centrifugal force curve. The dot and dash curve represents the resistance which the gear 49 opposes to the weight 133 to restrain clutch engagement, when the engine is exerting one-fourth its maximum effort, and, as will be seen by the diagram, this curve crosses the centrifugal force curve at 211 instead of at 202. Thus when maximum engine effort is applied to move the vehicle up a given incline, clutch engagement, to eliminate the gearing, will not take place unless and until the clutch weights can be brought up to fifteen hundred R. P. M. while, when one-fourth the maximum engine effort is being applied, clutch engagement and consequent elimination of gears, will be effected if and when the clutch speed is raised to one thousand R. P. M. But in this the time element must be considered, for, given a certain incline to overcome, the full power of the engine may force its way to the point 202 in a very few seconds, but one-fourth of its maximum power may never be able to force its way to the point 211, in which case the vehicle would continue up the entire length of the incline without the clutch engagement and its resulting gear elimination unless more fuel was fed to increase the power.

By a study of the diagram it will be seen that if the operator of this improved transmission wishes to get under way as quickly as possible he has only to open the fuel valve wide at once and the engine will, as quickly as it is able, depending on the grade, accelerate the vehicle to twelve miles per hour in low gear, shift to intermediate gear, further accelerate to twenty-four miles per hour, and shift into high gear. On the other hand if he is in no hurry he may open the fuel valve to one-fourth its capacity and the engine will, if the road is level or but slightly up grade, but of course in a much longer time, raise the speed of the vehicle first to eight miles per hour in low gear, shift to intermediate, raise the speed to sixteen miles per hour, then shift to high.

*The operation of the reversing mechanism*

With the lever 156, Fig. 1, in the position shown, the transmission is in neutral, and in this state the engine may be run at any speed within its range without turning the drive shaft 26. When by the lever 156 and the arm 157 the gear 53 is shifted until the teeth 162 engage the teeth 164, the drive shaft will be rotated in the same direction as the engine rotates. But when the gear 53 is shifted into mesh with the idler gear 64 (see Figs. 2 and 18) the shaft 26 will be rotated oppositely from the engine. There are however only two reversing speeds, that is, if the engine is being run slowly the power may be transmitted from gear 48 to 56 to 57 to 49 to 51 to 58 to 61 to 64 to 53. But if the engine is run faster, the power may be transmitted from gear 48 to drum 129 to shoes 131 to carrier 132 to gears 51 to 58 to 61 to 64 to 53, thus in the latter case eliminating the one gear train and doubling the rearward vehicle speed at the same engine speed. There are then two reversing speed ratios, the one double the other.

The spring ratchet 200 is provided to permit movement of the vehicle on momentum, that is, to permit coasting, or freewheeling, whether the speed of the several clutches is such as to engage them or not.

*The operation of the oiling mechanism*

Since the gears and clutch members which are mounted on the drive shaft 26 rotate at a different speed from the shaft itself whenever the transmission is in gear, it is essential that an adequate supply of oil be at all times kept in the oil supply opening 42. The oiling mechanism 43 is operative to partly fill the opening 42 each time the shaft 26 ceases to rotate. Whenever the vehicle is stopped the shaft 26 comes to rest. The oil in the reservoir 178 flows down the oil hole 169 into the pocket 168 and upward through a hole 172 into the hole 174. Hole 172 is small so that the quantity of oil that can pass through it into hole 174 will rather seek the lower level provided by opening 42 (see Fig. 1) than the higher level provided by the hole 176. As the oil flows into opening 42 the air moves out of the opening 42 through the holes 176 and 173.

When the shaft 26 again starts to rotate some of the oil will of course be forced out by the centrifugal force of the oil in the holes 172, even though this force must act against the head provided by the supply in the reservoir 178. But there will always remain in the opening 42, after the shaft rotates, a layer of oil in the form of a hollow cylinder having an outside diameter equal to the opening 42 and an inside diameter equal to the opening 174. No part of this cylinder of oil will move into the opening 174 since to do so it would have to move closer to the axis of rotation against the centrifugal force due to its weight. The cylinder of oil is replenished each time the vehicle is brought to a stop.

While I have herein shown a transmission having three speeds forward and two reverse it is obvious that a unit comprising a clutch as 46 and gears as 48, 56, 57 and 49 may be added by lengthening the transmission so as to provide four speeds forward and three reverse. It is also probable that for very small vehicles one unit comprising a clutch 46 and gears 48, 56, 57 and 49 may be eliminated by shortening the transmission whereby a transmission having two speeds forward and one reverse would result.

In my co-pending application Serial Number 687,758, filed September 1st, 1933, I show a transmission mechanism having a single auttomatic unit, which unit is somewhat similar in principle to those herein shown, in that there is a torque responsive means carried by the driven mechanism which utilizes the torque load, which is at any time being transmitted, to keep the speed responsive means from engaging the clutch.

In both the said co-pending and the present application the driven mechanism comprises two elements connected to rotate together, one element, however, being capable of gaining or losing a small fraction of a revolution with respect to the other element upon outward or inward movement of the weights when effecting clutch engagement or disengagement.

There is, however, a considerable difference in principle between the two applications in this; that in the present application the weights are carried on the second element of the driven mechanism, that is, they are carried on the power take-off element, while in the co-pending application they are carried on the power receiving element.

The result of the foregoing difference in principle causes a radical difference in operation in this; that in the present application the torque responsive means operates only to restrain clutch engagement. It does not aid clutch disengagement. But in the co-pending application the torque responsive means both restrains clutch engagement and aids disengagement after the clutch is engaged. It follows that in the present application the entire force generated by the weights keeps the clutch engaged after it is engaged, while in the co-pending application there must be provided a clutch of low engaging pressure which will remain engaged on a pressure which is the difference between the force of the weights tending to engage and the torque tending to disengage.

The oiling mechanism herein disclosed is shown and claimed in my co-pending application Serial Number 675,238, filed June 10, 1933.

As my invention, I claim,

1. An automatic speed changing transmission unit comprising, in combination, a drive shaft, an axially parallel countershaft, a driving gear revolvable on said drive shaft, a second gear on said countershaft in constant mesh with said driving gear, a third gear on said countershaft adjacent said second gear, a ratchet connecting the second and third gears whereby the third gear may revolve faster but not slower than the second gear, a fourth gear surrounding said drive shaft in constant mesh with said third gear, a clutch member surrounding said drive shaft between said drive gear and said fourth gear and permanently secured to said drive gear to rotate in unison therewith, a clutch carrier surrounding said drive shaft between said clutch member and said fourth gear, a friction member supported on said carrier operable into engagement with said clutch member, a weight to operate said friction member into said engagement, and linkage connecting said fourth gear to said weight whereby said fourth gear may revolve said carrier through said weight, said linkage being so placed relative to said fourth gear and said weight that movement of said weight toward the axis permits slight gain in rotative movement of said gear over said carrier and movement of said weight away from the axis causes slight gain in rotative movement of said carrier over said gear and engages said friction member with said clutch member and removes all load from said gears.

2. An automatic speed changing transmission unit comprising, in combination, a drive shaft, an axially parallel countershaft, a driving gear revolvable on said drive shaft, a second gear on said countershaft in constant mesh with said driving gear, a third gear on said countershaft adjacent said second gear, a ratchet connecting the second and third gears whereby the third gear may revolve faster but not slower than the second gear, a fourth gear surrounding said drive shaft in constant mesh with said third gear, a clutch drum having one side closed surrounding said drive shaft between said drive gear and said fourth gear permanently secured at the closed side to said drive gear to revolve in unison therewith, a clutch carrier within said drum, a hub on said clutch carrier extending from the open side of said drum into said fourth gear, said fourth gear having limited rotative movement on said hub, a clutch-shoe hinged at one end to said carrier, the other end being swingable outwardly into engagement with said drum, a clutch weight hinged at one end to said carrier the other end being swingable outwardly to operate said shoe, multiplying linkage connecting said weight and said shoe whereby a small force exerted by said weight exerts a greater force on said shoe to force said shoe against the inside of said drum, and linkage connecting said fourth gear to said weight whereby said carrier is rotatively driven by said fourth gear through said weight, said linkage being so connected to said weight that gain in rotative movement of said fourth gear over said carrier draws said weight against the centrifugal force toward its axis of rotation, and gain in rotative movement of said weight over said fourth gear permits said weight to move outwardly to engage said clutch.

3. An automatic speed changing transmission unit comprising, in combination, a drive shaft, an axially parallel countershaft, a driving gear revolvable on said drive shaft, a second gear on said countershaft in constant mesh with said driving gear, a third gear on said countershaft adjacent said second gear, a spring ratchet connecting the second and the third gears whereby the third gear may revolve faster but not slower than the second gear, a fourth gear surrounding said drive shaft in constant mesh with said third gear, a clutch drum having one side closed surrounding said drive shaft between said drive gear and said fourth gear permanently secured at the closed side to said drive gear to revolve in unison therewith, a clutch carrier within said drum, a hub on said clutch carrier extending from the open side of said drum into said fourth gear, said fourth gear having limited rotative movement on said hub, arms extending oppositely from said clutch carrier within said drum, two clutch shoes each having one end hinged to an arm of said carrier and the other end swingable outwardly into engagement with said drum, two clutch weights each having one end hinged to an arm of said carrier and the other end swingable outwardly toward the said shoes, multiplying linkage connecting said weights and said shoes whereby a small force exerted by said weights exerts a greater force on said shoes to force said shoes against the inside of said drum, studs carried by said weights, forked arms extending laterally from said fourth gear into said drum with the forks straddling said studs, said studs being so placed on said weights in relation to their hinge pins that slight gain in rotative movement of said gear over said carrier moves the center of gravity of said weight closer to the axis of rotation, and slight loss of rotative movement of said gear over said carrier permits the center of gravity of said weights to move farther from the axis of rotation to force said shoes through said linkage to engage said drum to drive said carrier by said drum independently of any of said gears.

4. The combination, in power transmission mechanism, of a clutch comprising two independently rotatable members, speed responsive means on the one said member movable in one direction for effecting connection to the other said member, two power transmitting members connected for rotation one with each of said clutch members, and means responsive to the load carried by one of the said power transmitting members for moving said speed responsive means in the other direction for disconnecting the clutch members.

5. In power transmission mechanism, a driving clutch member, a driven clutch member, a power transmitting member connected to be rotated by the driving clutch member, a second power transmitting member connected for rotation in unison with the driven clutch member, speed responsive means on the driven clutch member for connecting it to the driving clutch member, and load responsive means on the second said power transmitting member for restraining said speed responsive means from acting.

6. Power transmission mechanism comprising, a driving clutch member, a driven clutch member, speed responsive means on said driven clutch member for connecting the two said clutch members in driving relation, a power transmitting member secured for rotation with the driving clutch member, a second power transmitting member secured for rotation with the driven clutch member, and linkage joining the said second power transmitting member to said speed responsive means operable by load on said second power transmitting member to prevent said speed responsive means from connecting the two said clutch members in driving relation.

7. Power transmission mechanism comprising, a driving clutch member, a driven clutch member, a gear train connecting the driving and driven clutch members for revolving the driven clutch member at a lesser speed than the driving clutch member, speed responsive means on the driven clutch member operative to move the driven clutch member into engagement with the driving clutch member, load responsive means in the gear train connected to the speed responsive means for opposing operation of the speed responsive means, and overrunning means in the gear train for allowing the driven clutch member to revolve faster than it may be driven through said gear train.

8. Power transmission mechanism comprising, a driving clutch member, a driven clutch member, means secured to said driven clutch member operative by speed of said driven clutch member to join the driving and driven clutch members to revolve in unison, a gear train for revolving said driven clutch member at a lesser speed than said driving clutch member, said gear train being connected to said driven clutch member only by connection to said speed responsive means, whereby load on said gear train restrains operation of said speed responsive means, and overrunning means in said gear train to permit the driven clutch member to revolve as fast as the driving clutch member.

9. Power transmission mechanism comprising, in combination, a driving clutch member, a driven clutch member, centrifugal weights carried by said driven clutch member operative to move outwardly from the axis of the clutch to connect said driving and driven members to revolve in unison, a gear train for operating said driven clutch member at a lower speed than said driving clutch member, linkage in said gear train connecting said gear train to said centrifugal weights whereby said gear train may drive said driven clutch member, said linkage being so connected to said weights that load on said gear train draws the weights inwardly toward the clutch axis, and overrunning means in said gear train to permit the driven clutch member to revolve faster than it may be driven by said gear train.

10. The combination, in power transmission mechanism, of a driving clutch member, a driven clutch member, a gear train connecting the driving and driven clutch members which revolves the driven clutch member at less speed than the driving clutch member, centrifugal weights on the driven clutch members operative to swing outwardly from the axis of the clutch to connect said driving and driven clutch members directly and independently of said gearing, means connecting said gear train to said weights, means connecting said weights to said driven member, the first said means being connected to said weights at such points that resistance of said driven member to being revolved by said weights draws said weights toward said axis, and overrunning means in said gear train to permit the driven clutch member to revolve faster than it may be driven by said driving clutch member through said gear train.

11. Power transmission mechanism comprising, in combination, a driving clutch member, a driven clutch member, means comprising centrifugal weights carried by the driven clutch member operative by outward movement away from the clutch axis to directly connect the driving and driven clutch members, a gear train having the first gear connected to the driving clutch member and the last gear connected to said weights at such points that outward movement of said weights must advance the rotation of said driven member with respect to said last gear against the load on said driven member, and overrunning means in said gear train to permit said driven clutch member to revolve faster than it may be driven by said driving clutch member through said gear train.

12. Power transmission mechanism comprising, in combination, a driving clutch member, a driving gear secured directly to said driving clutch member, a driven clutch member, a coaxial driven gear, means for directly connecting the driving and driven clutch members comprising centrifugal weights hinged at the one end on said driven clutch member and having the free end swingable outwardly, pivot pins on said weights spaced apart from said hinge pins, arms extending from said driven gear connected to said pivot pins, the position of said pivot pins being such that outward swinging of said weights about their hinges advances the driven clutch member part of a revolution with respect to said driven gear against the load, gearing connecting the driving and the driven gears, and overrunning means in said gear train for permitting said driven clutch member to revolve faster than it may be driven by the driving clutch member through said gearing.

13. A power transmitting unit comprising, a driving clutch member, a power transmitting member connected for rotation with the driving clutch member, driven clutch mechanism comprising an element for receiving power from the said power transmitting member at a reduced speed and a second element for taking power from the said unit, said power take-off element being connected to said power receiving element to revolve in unison therewith but being capable of gaining or losing a fraction of a revolution of rotative movement with respect thereto, centrifugal weights carried on the power take-off element operable outwardly to directly connect said driven clutch mechanism to revolve in unison with said driving clutch member, and means connecting said power receiving element to said weights whereby outward or inward movement of said weights from or toward their axis of rotation, causes a gain or loss of a part of a revolution of rotative movement of said power take-off element with respect to said power receiving element.

14. A power transmitting unit comprising, a driving member, driven mechanism comprising an element for receiving power from the driving member at a reduced speed and an element from which power is taken from the said unit, power transmitting means for conveying power from the said driving member to the power receiving element of the driven member, centrifugal weight means carried by the power take-off element movable outwardly to directly connect said driving member to said driven mechanism, and means connecting the said power receiving element to said weights whereby outward movement of said weights advances said power take-off element a fraction of a revolution of rotative movement with respect to said power receiving element.

15. In combination, a prime mover and a power transmitting unit having a driving member supplied with power by said prime mover and driven mechanism comprising an element for receiving power from said driving member at a reduced speed and an element from which power is taken from said unit, centrifugal weights carried on said power take-off element movable outwardly from the axis of rotation, means engageable by said weights to directly connect said driving member and said driven mechanism to revolve together, and means connecting said power receiving element to said weights whereby a loss of a fraction of a revolution of rotative movement by said power take-off element with respect to said power receiving element, draws said weights inwardly to disengage said direct connecting means.

16. A power transmitting unit comprising a driving member supplied with power from a power source, an element from which power is taken from said transmitting unit, clutch means carried on said power take-off element for connecting said power take-off element directly to said driving member, centrifugal weights carried by said power take-off element operable outwardly for engaging said clutch means, and gear means connecting said driving member to said weights whereby said driving member rotates said weights at a reduced speed and said weights rotate said power take-off element, means connecting said gearing to said weights operative when the torque being carried by said gearing exceeds the centrifugal force of said weights to draw the weights inwardly and disengage said clutch means.

17. Automatic speed changing transmission mechanism comprising, a driving clutch member, a driven clutch member, speed responsive means carried on said driven clutch member operative to connect said driving and driven clutch members to revolve in unison, a power take-off element rigidly secured to said driven clutch member against rotative movement with respect thereto, reduction gearing connecting said driving clutch member to said driven clutch member, the lowest speed member of said reduction gearing being drivably connected to said driven clutch member but having a fraction of a revolution of rotative movement with respect to said driven clutch member, and torque responsive means carried on said lowest speed member of said reduction gearing operative by said fraction of a revolution of rotative movement to restrain said speed responsive means from connecting said driving and driven clutch members.

18. The combination of a driving member, a driven member, a centrifugal body carried by the said driven member and adapted under the influence of centrifugal action to effect driving connection between the driving member and the driven member, power transmitting means for imparting movement to the driven member independently of the said driving connection, and a torque responsive connection between the said power transmitting means and the centrifugal body to control the said driving connection between the driving member and the driven member.

19. Power transmission mechanism comprising, a driving member, a driven member, speed responsive means between said members operative to connect said members directly, gear means connecting them to revolve at different speeds, and a torque operated means joining one of said connecting gears to said speed responsive means operative by the torque load transmitted by said gear to oppose operation of said speed responsive means.

20. Power transmission mechanism comprising, a driving member, a driven member, gearing connecting said members to revolve said driven member at a reduced speed, a clutch element on each of said members engageable for connecting said members for revolving them in unison, a centrifugal device carried by one of said members operable outwardly for engaging said clutch, a torque responsive device carried by one of said members connected to said centrifugal device applying a resistance which varies with the power being transmitted to overcome said centrifugal device and disengage said clutch, and a spring operative to force said clutch elements apart to disengage said clutch at a fixed speed when said power being transmitted becomes zero and no variable torque resistance is being offered.

21. Power transmission mechanism comprising, a driving member, a driven member, gearing connecting said members to revolve said driven member at a slower speed than said driving member, a clutch for connecting said members to revolve in unison, a centrifugal device rotatable by one of said members for engaging said clutch, a torque device, rotatable by one of said members, responsive to variation in the power being transmitted resisting engagement of said clutch by said centrifugal device, and a spring offering a uniform resistance to the effecting of clutch engagement by said centrifugal device operative to be overcome at a predetermined fixed speed when the said torque device is inoperative.

22. Automatic speed-changing transmission mechanism comprising a power operated driving member, a load resisted driven member, a gear train having a gear on said driving member and a gear on said driven member whereby said driven member is revolved at a lesser speed than said driving member, a clutching means on the said driving member, a clutching means on the said driven member, speed responsive means carried by one of said clutching means operable to press said one clutching means into engagement with the other clutching means thereby directly connecting said driving and driven members and removing the load from said gearing, a torque responsive means connecting said gearing to said speed responsive means whereby load on said gearing restrains operation of said speed responsive means, and an overrunning ratchet in the said gear train permitting the driven gear to revolve faster than it may be driven by the driving gear.

23. Automatic speed changing transmission mechanism comprising a power operated driving member, a load resisted driven member, gearing connecting said driving member to said driven member revolving said driven member against the load at a lower speed than said driving member, a clutching means on said driving member and a clutching means on said driven member, centrifugal means on one of said clutching means operable outwardly to press said one clutching means into engagement with the other clutching means thereby directly connecting said driving member to said driven member and removing the load from said gearing, and a connecting means between one of said gears and said centrifugal means operative by load on said gear to draw said centrifugal means inwardly to prevent engagement of said clutching means.

24. Automatic speed-changing transmission mechanism comprising a power operated driving member, a load resisted driven member, gears connecting said driving member to said driven member revolving said driven member against the load at a lower speed than said driving member, a clutching means on the driving member, a clutching means on the driven member, a centrifugal means carried by the clutching means on the driven member, a means connecting said centrifugal means to said driven member clutching means whereby outward movement of said centrifugal means moves said driven clutching means into engagement with said driving member clutching means thereby directly connecting said driving member to said driven member and removing the load from said gears, and a connecting means joining one of said gears to said centrifugal means whereby load on said gear draws said centrifugal means inwardly.

25. Automotive transmission mechanism comprising a transmission housing, an engine outside of said housing, a rotatable member of said engine extending into said housing, clutching means on said rotatable member within said housing, an automatic transmission unit as defined in claim 24, a clutch member on said unit adjacent the clutching means on said rotatable member, and a centrifugal means on said clutching means operative outwardly at a determined speed of said engine to connect said clutching means and said clutch member in driving relation.

26. In a device of the character described, a driving member, a driven member, a clutch connecting said members, resilient means urging disengagement of said clutch, speed responsive means connecting the driven member and clutch urging engagement of said clutch, torque responsive means connected to the speed responsive means opposing said speed responsive means, and means connecting the driving and driven members around the clutch upon disengagement thereof.

27. In a device of the character described, a driving member, a driven member, a clutch connecting said members, resilient means urging disengagement of said clutch, speed responsive means connecting the driven member and clutch urging engagement of the driving and driven clutch, means connecting said members around the clutch upon disengagement thereof, and torque responsive means joining said connecting means to said speed responsive means opposing said speed responsive means engaging said clutch.

28. In a device of the character described, a driving member, a driven member, a clutch connecting said members, a speed responsive means urging engagement of said clutch, gearing connecting said members around said clutch upon disengagement thereof, and a torque responsive means connecting said gearing to said speed responsive means opposing said speed responsive means engaging said clutch.

FREDERICK W. COTTERMAN.